(12) United States Patent
Nair

(10) Patent No.: US 7,171,471 B1
(45) Date of Patent: Jan. 30, 2007

(54) METHODS AND APPARATUS FOR DIRECTING A RESOURCE REQUEST

(75) Inventor: Raj Krishnan Nair, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 794 days.

(21) Appl. No.: 10/219,402

(22) Filed: Aug. 15, 2002

(51) Int. Cl.
 G06F 15/173 (2006.01)
(52) U.S. Cl. .................................. 709/226; 707/10
(58) Field of Classification Search ............. 709/226, 709/217, 229; 707/3, 10, 9
 See application file for complete search history.

(56) References Cited

U.S. PATENT DOCUMENTS

| | | | |
|---|---|---|---|
| 6,006,264 A | 12/1999 | Colby et al. | 709/226 |
| 6,415,323 B1 | 7/2002 | McCanne et al. | 709/225 |
| 6,449,647 B1 | 9/2002 | Colby et al. | 709/226 |
| 6,453,337 B1 | 9/2002 | Miller et al. | 709/204 |
| 6,457,045 B1 | 9/2002 | Hanson et al. | 709/206 |
| 6,463,466 B1 | 10/2002 | Weyer | 709/217 |
| 6,643,639 B1 * | 11/2003 | Biebesheimer et al. | 707/3 |
| 6,804,700 B1 * | 10/2004 | Terek et al. | 709/203 |
| 2002/0073165 A1 * | 6/2002 | MuNulty et al. | 709/217 |
| 2002/0194168 A1 * | 12/2002 | Min et al. | 707/3 |
| 2003/0140035 A1 * | 7/2003 | Burrows | 707/3 |
| 2003/0233439 A1 * | 12/2003 | Stone et al. | 709/223 |
| 2004/0010489 A1 * | 1/2004 | Rio | 707/3 |
| 2005/0193115 A1 * | 9/2005 | Chellis et al. | 709/226 |

* cited by examiner

Primary Examiner—Abdullahi Salad
(74) Attorney, Agent, or Firm—BainwoodHuang

(57) ABSTRACT

The invention is directed to techniques for receiving the resource request in which the resource request contains a set of resource preference properties and in which the set of resource preference properties has a resource preference property. The data communications device compares the set of resource preference properties to a database of resource definitions to select a resource, the resource being most closely identified with the set of resource preference properties. The result is to provide a resource response from the selected resource.

24 Claims, 7 Drawing Sheets

500

126 {
GET WWW.ARROWPOINT.COM/CORPORATE/NAMESPACE
<XML VERSION="1.0"?>
</PRINTER>
</POSTSCRIPT>YES</POSTSCRIPT> —128
</LOCATION>NORTH</LOCATION>
</PRINTER>

128 — </POSTSCRIPT>YES</POSTSCRIPT>
         ⎵⎵⎵⎵⎵ ⎵⎵ ⎵⎵⎵⎵⎵
           610    620   610

129 {
GET WWW.ARROWPOINT.COM/CORPORATE/NAMESPACE
<XML VERSION="1.0"?>
</PRINTER>
</RESADD>196.28.62.11</RESADD>
</LOCATION>NORTH</LOCATION>
</COLOR>BW</COLOR>
</POSTSCRIPT>NO</POSTSCRIPT>
</PRINTER>
[REMOTE CALL] —135

FIG. 7

METHODS AND APPARATUS FOR DIRECTING A RESOURCE REQUEST

BACKGROUND OF THE INVENTION

One major focus of providing content and services over the Internet is the configuration of the Internet network and systems to provide responses to requests for content and services over a wide ranging geographic area. Servers providing content and/or services may be strategically located near clients requesting the content and/or services. Another such example of server traffic management is the concept of a server redirecting client requests to a secondary server that may be more convenient for providing the requested content. The secondary server, in that case, may contain a copy of the originally-requested content with which the secondary server may fulfill the client request.

In some cases, such traffic management has less to do with managing network facilities or managing the closeness and speed of a server responding to a content request than it does managing the capacity of servers providing the content and/or services. For example, in some cases, when the volume of requests is too great to be served by one server, multiple servers may contain duplicate copies of content used to fulfill content requests. Another device is responsible for either intercepting or receiving a content request, then deciding, based on an algorithm of some sort, which of the multiple servers containing the content should be tapped to fulfill the content request. The device then forwards a request to the chosen server to provide the requested content. In that situation, the device is reducing the workload of one server by causing client requests to be fulfilled from the other duplicate server. In some situations, the device balances workload between many duplicate servers.

In different circumstances, forwarding devices may forward client requests to different servers using any of a variety of mechanisms. One such mechanism used is for the device to read a uniform resource locator (URL) and use all or part of the URL to make a determination where the client request should be served from. The device may use tables or other information, as well, in making that determination. In other systems, the forwarding device may read user identification information such as "cookies" or transmission information such as TCP/IP header information, etc. in order to facilitate the determination of which server to forward to.

HyperText Markup Language (HTML) is a document control language that has been an important tool in the development of the Internet by providing a simple, though elegant way of formatting data so that it can be viewed on virtually any computer. Extensible Markup Language (XML) extends the capability of HTML beyond its format-oriented functioning into the role of providing additional information about a document's data, thereby permitting re-use of the data in different situations. In XML, data are stored in the form of elements, each delimited by tags. The tags identify the elements of data and separate individual elements from each other. XML also provides a feature, called a namespace, which provides a mechanism to distinguish between elements with the same name that are derived from different sources. Accordingly, a namespace name is designated to identify a particular set of elements. In that way it is possible to distinguish between elements from different namespaces that may have a different meaning even though they have the same element name.

SUMMARY OF THE INVENTION

Unfortunately, there are deficiencies in the conventional techniques for forwarding client requests to alternative servers. In particular, it is difficult to achieve network location independence for client-requested objects (e.g. data, services, anything capable of being selected) short of replicating an entire web site at a different global location and/or creating and maintaining complicated content rules that carve out the web site into local partitions.

For example, in a device for forwarding a client request to one of multiple load-balanced servers, the conventional technique employed is for each of the load-balanced servers to be a duplicate of the other servers. However, in the case of a client request that requires obtaining data and engaging a service provided by one of the duplicate servers, it may not be efficient to store both the data and the facility to provide the service on all of the duplicate servers. If, for example, the service that processes the data requires extensive processing resources, it may be wasteful to consume the storage necessary to store the data along with the software, etc. for providing the service on every duplicate server. In another example, if the data being used changes very frequently, it may be burdensome to maintain the data on each of the duplicate servers.

It is also difficult to obtain customized objects using conventional techniques. For example, as described above, it may be impractical to entirely duplicate the data on each server, in the case of data which changes frequently. One conventional alternative is to create local partitions of such data on each server. However, it is a technically challenging task to create and maintain the complicated content rules used to carve out the web site into such local partitions, in this example, partitions of data. This situation also limits the ability of clients to customize requests for objects from different server locations without advance identification and preparation on the servers where such objects are stored.

In addition to the already mentioned problems concerning effective allocation of content and/or objects among alternative servers, there are problems with respect to resiliency of provided objects, services, etc. The term resiliency is a reference to how well a provider of an object (e.g. content, services, etc.) responds to a less-than-accurate request. For example, in the case of a simple web page request, failure to type a web page address accurately when making a web page request is likely to result in a "page cannot be displayed" response to the client making the request. In effect, there is little resiliency to requests for certain improperly typed web page addresses. Servers have limited ability to respond to requests that do not precisely name a sought-after object, service, etc. As a result, if such a sought-after object or service is not precisely identified, the likelihood of an effective response is small.

In addition, by virtue of the growing number of Internet-related objects, services, etc. it becomes more and more difficult to identify and locate the objects, services, etc. by name. Simple string matching (for example, as done in the present day search engines) yield progressively more unfocussed results that need additional processing and/or interpretation.

The invention is directed to techniques for a providing network-level object request brokering service that can be used as a mechanism for object or service discovery and which enables a client to make an object request without knowing it's actual network location beforehand.

By using the Universal Resource Identifier (URI) address format and using an Extensible Markup Language (XML)

metadata format to designate characteristics (e.g. preference properties) of a sought-after object or service (e.g. a resource response), embodiments of the invention are able to identify the sought-after resource response and its location, even without an precise name or address of the sought-after object or service. Accordingly, such a client request contains one or more resource preference properties of the sought-after resource response. Upon receipt of the request, a data communications device, such as a content services switch, parses the request to obtain a set of resource preference properties. In turn, the data communications device matches individual resource preference properties to resource definitions maintained on the data communications device database.

By matching the resource preference properties and resource definitions, the data communications device can identify the resource (e.g. either a server itself, or a resource in the form of an object or service that may even be stored on a server) and the location from which the resource is accessible, on a separate server. Different types of matching of the resource preference properties and resources may be employed such as closest, superset and exact matches, etc.

In addition, other information may be employed in the matching process. For example, different types of transmission protocol information, cookie information, etc. may be incorporated into the matching process. XML namespaces may also be used to validate resource preference properties. In one embodiment of the invention, a resource description framework, may be employed, in conjunction with the primary namespace. In one example, a resource description framework may point to another resource description framework in a more specific namespace. This allows support for a hierarchy of namespaces from generic to concrete through multiple indirection.

Another feature of the embodiments of the invention is the ability to use remote procedure calls such as a Java™ remote method identifiers, embedded in resource definition metadata for processing requests from remote servers.

By providing such object level accessibility to client requests, embodiments of the invention make possible the ability to access a wide range of objects (e.g. which may be housed over diverse locations) including such object management functions as object routing, service discovery, XML-CORBA internetworking, etc.

Finally, embodiments of the invention, can be provided with a resource binding service to a resource capable of providing access to objects. By doing so, a client is enabled to access those objects by proper specification using the XML resource preference properties. Such objects can even be used to provide functions such as control over desired network routes, for example, such as for selection of inexpensive vs. higher performance routes. Functions such as client control over the data communications device (e.g. such as a content services switch) itself, are also possible. Other objects may also access user profiles that can, in turn, be incorporated into the matching process.

In one embodiment, a data communications device receives the resource request, the resource request containing a set of resource preference properties, the set of resource preference properties having at least one resource preference property. The data communications device compares the set of resource preference properties to a database of resource definitions to select a resource, the resource being most closely identified with the set of resource preference properties among multiple resources which are suitable for responding to the resource request. Then the data communications device provides a resource response from the selected resource. The data communications device uses resource preference properties to identify the resource or resource response even in the absence of a specific name or address in order to identify a desired resource or resource response.

In another embodiment, the set of resource preference properties includes a resource preference property formatted as a markup language element, the markup language element having a tag which delimits the markup language element. The data communications device extracts the markup language element from the set of resource preference properties based on the tag. Resource preference properties can be extracted from the extensible markup language-formatted resource request using the tags which identify each resource preference property as well as separate them from each other.

In another embodiment, the data communications device isolates the markup language element within the set of resource preference properties based on the tag and obtains data of the markup language element for comparison with the database of resource definitions. The data from the tags are compared to see if a match exists.

In yet another embodiment, the resource which is most closely identified with the set of resource preference properties is a remote server and the data communications device provides, as the resource response, content from the remote server. Having identified the requested resource (and its location), the data communications device can generate a request to fulfill the original client request, even though the client did not know the actual location of the requested resource at the time of making the original request.

In still another embodiment, the resource definitions contain an instruction for accessing a resource located on a remote server and the instruction operates the resource. The data communications device locates the instruction for the resource most closely identified with the set of resource preference properties. The data communications device executes the located instruction for the resource most closely identified with the set of resource preference properties in order to provide the resource response from the selected resource. The resource definitions may contain an actual command or a remote call which causes the requested resource (e.g. server, object or service, etc.) to be selected and/or processed.

In another embodiment, the resource preference properties of the set of resource preference properties are associated with the resource definitions of the resources and the database of resource definitions contains the resource definitions of the resources. The data communications device matches each of the resource preference properties of the set of resource preference properties to the resource definitions of the resources and adds to a point value for each resource definition that matches one of the resource preference properties. Then the data communications device picks, as the selected resource, the resource having the highest point value. In that way, the data communications device is able to select a resource based on the closest match of resource preference properties to resource definitions, even without a precise address or name of the resource.

In another embodiment, the data communications device matches each of the resource preference properties of the set of resource preference properties to the resource definitions of the resources and picks, as the selected resource, the resource for which all the resource preference properties of the resource request match the resource definitions of the resource. In this manner, the data communications device is able to identify a resource for which a superset match exists with the resource preference properties.

In yet another embodiment, the data communications device matches each of the resource preference properties of the set of resource preference properties to the resource definitions of the resource and picks as the selected resource, the resource for which all resource preference properties of the resource request match the resource definitions of the selected resource such that all of the resource definitions of the selected resource also all match resource preference properties of the resource request. As a result, the data communications device identifies a resource for which there is an exact match between the resource preference properties of the resource request and the resource definitions.

In still another embodiment, a namespace definition is accessible to the data communications device. The namespace controls usage of the resource preference properties. The data communications device checks the namespace definition prior to comparing resource preference properties to resource definitions and processes the resource preference properties contained in the resource request and processing the resource definitions. The data communications device uses one or more namespaces to validate resource preference property elements and resource definitions before they are processed to determine if a match exists.

In another embodiment, the data communications device controls network communications functions. Any object components related to provision of the resource response are available to the data communications device. The data communications device generates a network control command identified with the set of resource preference properties in order to control communications of the resource response, packages any object components and forwards the network control command and the object components to a remote server to provide a resource response. Accordingly, a client, in the process of generating a resource request, is able to exert control over the communications of resource responses. It is also possible to provide a distributed access to objects and services that are ultimately provided from a variety of sources.

In another embodiment, a client provides a resource request having a set of resource preference properties, transmits the resource request to a data communications device, the data communications device having a database of resource definitions. Then the client receives, from the data communications device, a resource response from a selected resource for which the resource definitions most closely match the set of resource preference properties of the resource request. Thus a client is able to access resources without possession of a specific address or name of the requested resource.

In another embodiment, the set of resource preference properties includes a resource preference property formatted as a markup language element, the markup language element having a tag which delimits the markup language element. The client includes the markup language element in the set of resource preference properties. The client is able to transmit a resource request based on resource preference properties that are identified and delimited within the markup language-formatted elements instead of having to provide a specific resource name or address.

In another embodiment, the client obtains the tag, the tag identifying the markup language element and delimits the markup language element with the tag. The markup language formatting permits identification of individual resource preference properties within a resource request.

In another embodiment, the data communications device receives the resource request. The resource request contains a set of resource preference properties which have at least one resource preference property. The data communications device matches, based on a selection criteria comprising at least one of an "equal than" relationship, a "not equal than" relationship, a "greater than" relationship, a "less than" relationship, a "superset" relationship and a "subset relationship", the set of resource preference properties to a database of resource definitions, in order to select a resource. In turn, the data communications device provides a resource response from the selected resource.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 shows an example of a resource request which contains resource preference properties according to one embodiment of the invention.

FIG. 6 shows an extensible markup language element according to one embodiment of the invention.

FIG. 7 is a depiction of a resource definition for a resource according to one embodiment of the invention.

DETAILED DESCRIPTION

The invention is directed to techniques for providing a network-level object request brokering service that can be used as a mechanism for object or service discovery and which enables a client to make an object request without knowing it's actual network location beforehand.

By using the Universal Resource Identifier (URI) address format and using an Extensible Markup Language (XML) metadata format to designate resource preference properties of a sought-after object or service (e.g. a resource response), embodiments of the invention are able to identify the sought-after resource response and its location. Accordingly, a client request contains one or more resource preference properties of the sought-after resource response. Upon receipt of the request, a data communications device, such as a content services switch, parses the request to obtain a set of resource preference properties. In turn, the data communications device matches individual resource preference properties to resource definitions maintained on the data communications device in a database.

By matching the resource preference properties and resource definitions, the content services switch can identify the resource (e.g. either a server itself, or a resource in the form of an object or service that may be stored on a server) and the location from which the resource is accessible on a separate device. Different types of matching of the resource preference properties and resources definitions may be employed such as closest, superset and exact matches, etc.

Figure 1:
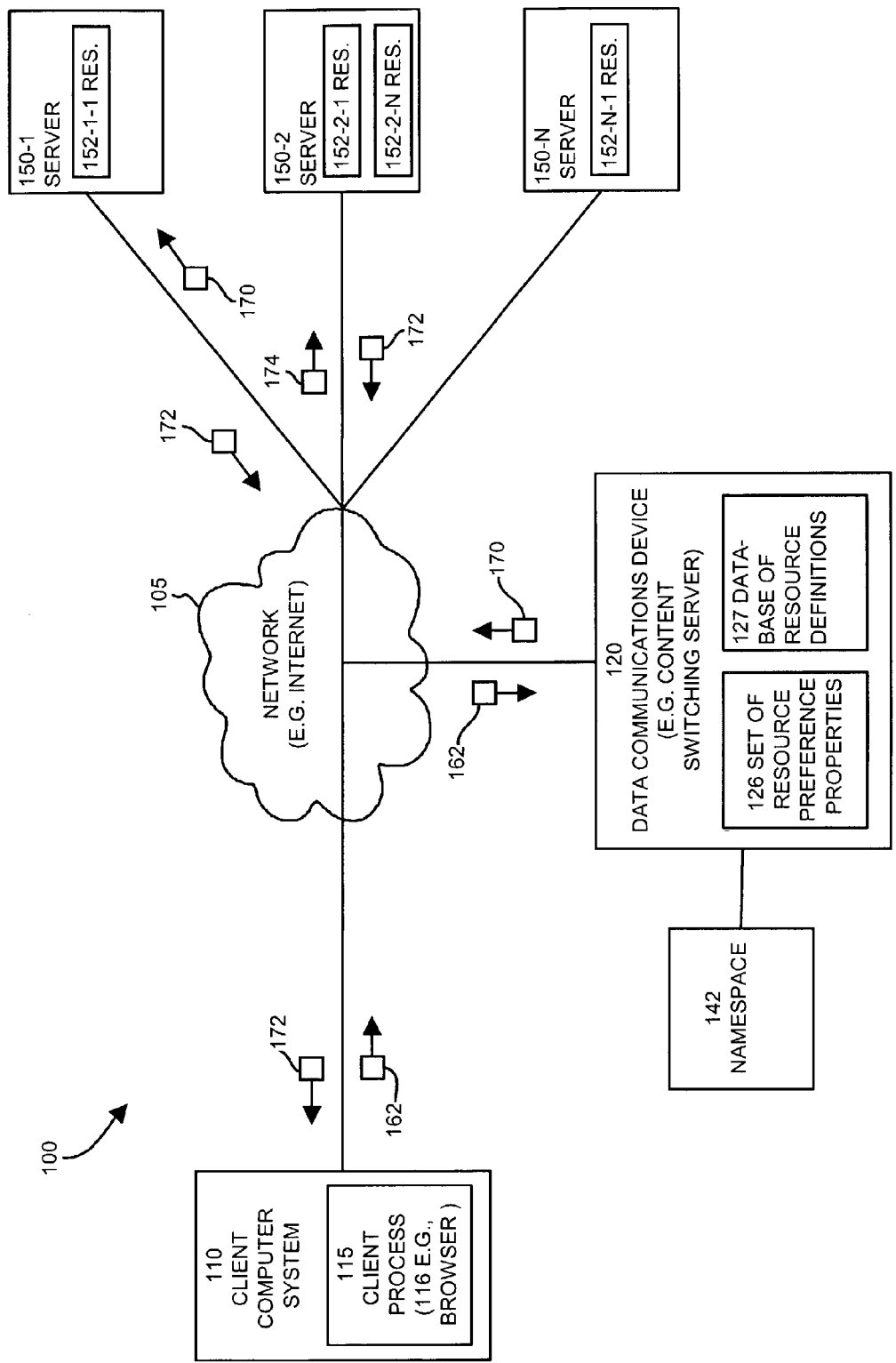
FIG. 1 is a system 100 for processing a resource request which is suitable for use by various embodiments of the invention.

FIG. 1 is shows a system 100 for processing a resource request which is suitable for use by various embodiments of the invention. The system 100 includes a client computer system 110 (e.g. client), a data communications device 120, multiple servers 150 and a namespace 142. The components of the system 110 communicate over a network 105 such as the Internet. The client 110 may have a client process 115 such as an Internet browser 116. The data communications device 120 has a set of resource preference properties 126 and a database of resource definitions 127.

There may be one or more servers 150-1 to 150-N, although only three are shown here for convenience of explanation. (The multiple servers 150 may themselves, at times, be referred to as resources, though at other times, resources may actually refer to the one or more objects or services that may exist on any of the servers 150 (e.g. in FIG. 1, server 150-1 is shown as containing one resource 152-1-1; server 150-2 is shown as containing two resources 150-2-1 and 152-2-N). The servers are collectively referred to, herein, by the reference number 150 and the resources are collectively referred to, herein, by the reference number 152.

FIG. 1 also shows a series of communications between the components of the system including a resource request 162, the object or service request 170 (i.e. as depicted with respect to server 150-1), the resource response 172 and an alternative object or service request 174 (i.e. an object request to a server containing multiple resources (e.g. 152-2-1 and 152-2-N) as depicted with respect to server 150-2).

In one embodiment of the invention the data communications device 120 receives a resource request 162 from a client computer system 110. The data communications device 120, in turn, is able to identify a resource 152 and its location by comparing the set of resource preference properties 126 found in the resource request 162 to the resource definitions database 127 maintained on the data communications device 120. In that way, a client computer system 110 is able to access resources 150, 152 (e.g. either the servers themselves, sometimes referred to as resources or the resources themselves existing on servers) which the client 110 may be incapable of specifically naming, and/or resources 150, 152 which the client 110 does not actually know the location of, in advance.

Figure 2:
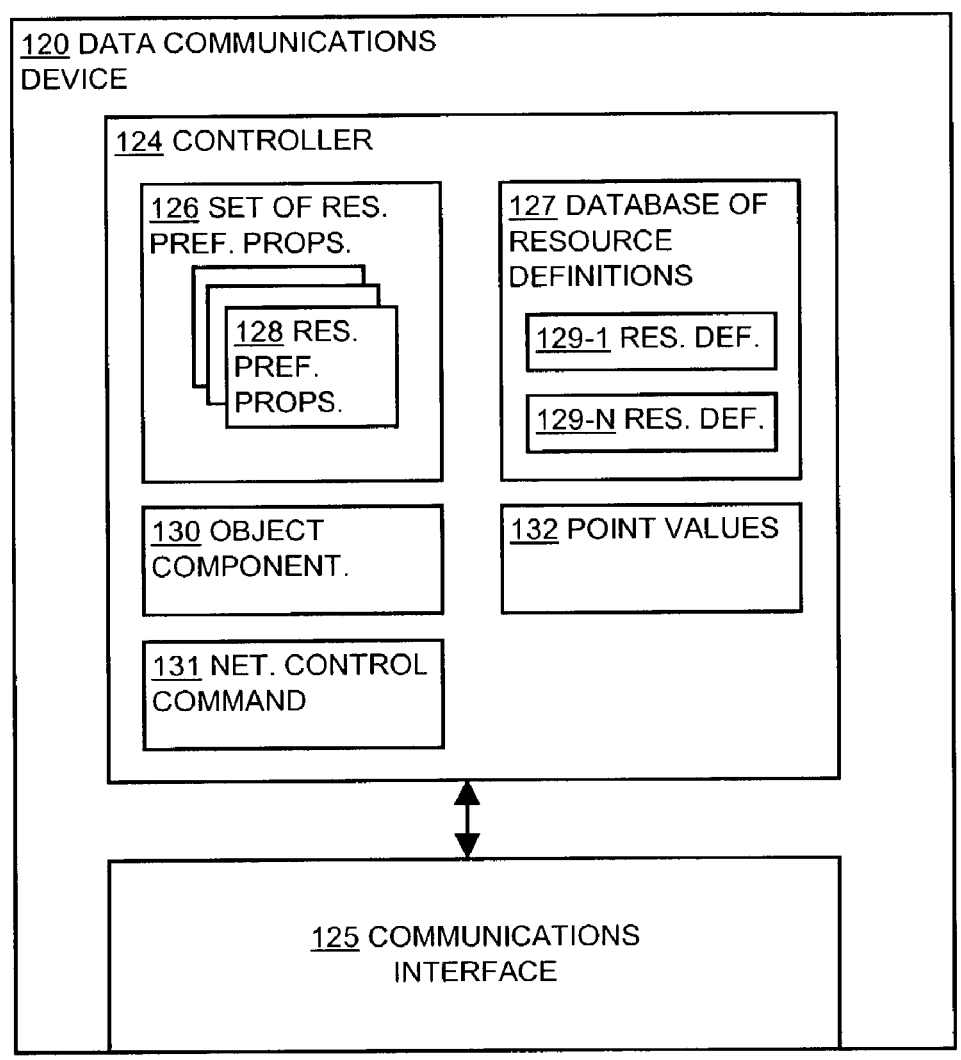
FIG. 2 depicts the components of a data communications device according to one embodiment of the invention.

FIG. 2 depicts the components of a data communications device 120 according to one embodiment of the invention. The data communications device 120 includes a controller 124 and a communications interface 125. The controller 124 includes a set of resource preference properties 126 containing one or more resource preference properties 128, an object component 130, a network control command 131 and point values 132 for use in the comparison of resource preference property 126 and resource definitions 129. The controller 124 also includes a database of resource definitions 127 which contains one or more individual resource definitions 129.

The data communications device 120 performs various functions in support of the comparison of the set of resource preference properties 126 to the database of resource definitions 127. For example, the data communications device 120 can perform a closest match of resource preference properties 126 to the database of resource definitions 127, as will be described in more detail later.

In addition to identifying a resource 150, 152 and its location, on behalf of a client 110, the data communications device 120 may access object components 130, accessible to the data communications device 120, that the data communications device 120 will process itself or forward to a server in conjunction with the original resource request 162. The data communications device 120 may also execute or forward a network control command 131 which the data communications device 120 has identified, as a result of the comparison of the set of resource preference properties 126 of the resource request 110 to the database of resource definitions 127, as will be discussed in more detail later.

Figure 3A:
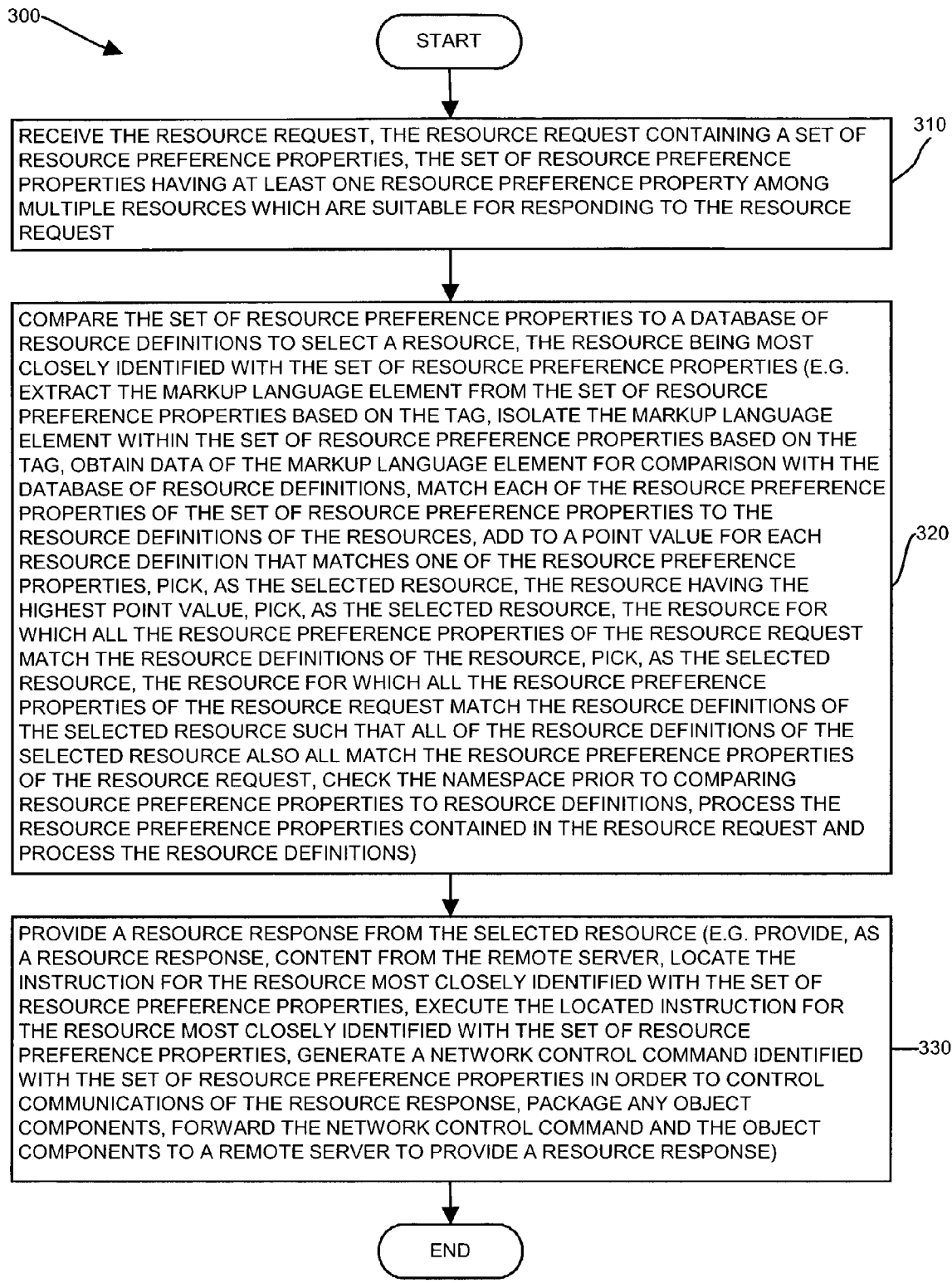
FIG. 3A is a flow chart of a procedure 300 for processing a request performed by a data communications device according to one embodiment of the invention.

FIG. 3A is a flow chart of a procedure 300 for processing a request performed by the data communications device according to one embodiment of the invention.

In step 310, the data communications device 120 receives the resource request 162, the resource request 162 containing a set of resource preference properties 126, the set of resource preference properties 126 having at least one resource preference property 128.

Resource preference properties 126 identify one or more qualities, preference properties, parameters or features, etc. of a desired resource 152 rather than the specific name of the resource, such as, for example, if the resource is a printer, the resource preference properties 126 might be the printer size, location, type of output, etc.

In step 320, the data communications device 120 compares the set of resource preference properties 126 to a database of resource definitions 127 to select a resource 150, the resource 150 being most closely identified with the set of resource preference properties 126 among multiple resources which are suitable for responding to the resource request. The data communications device 120 extracts the markup language element (See FIG. 5, 128) from the set of resource preference properties 126 based on the tag (See FIG. 6, 610). The data communications device 120 isolates the markup language element (See FIG. 5, 128) within the set of resource preference properties 126 based on the tag (See FIG. 6, 128). The data communications device 120 obtains data (See FIG. 6, 620) of the markup language element (See FIG. 5, 128) for comparison with the database of resource definitions 127. The data communications device 120 matches each of the resource preference properties 128 of the set of resource preference properties 126 to the resource definitions 129 of the resources 150, 152. The data communications device 120 adds to a point value 132 for each resource definition 129 that matches one of the resource preference properties 126. The data communications device 120 picks, as the selected resource 150, 152, the resource 150, 152 having the highest point value 132. The data communications device 120 can pick, as the selected resource 150, 152, the resource 150, 152 for which all resource preference properties 126 of the resource request 162 match the resource definitions 129 of the resource 150, 152. The data communications device 120 can pick, as the selected resource 150, 152, the resource 150, 152 for which all resource preference properties 126 of the resource request 162 match the resource definitions 129 of the selected resource 150, 152 such that all of the resource definitions 129 of the selected resource 150, 152 also all match resource preference properties 126 of the resource request 162. The data communications device 120 checks the namespace 142 prior to comparing resource preference properties 126 to resource definitions 129. Then the data communications device 120 processes the resource preference properties 126 contained in the resource request 162 and processes the resource definitions 129.

In one example embodiment of the invention the client 110 seeks to locate a printer capable of processing a particular print job. The client 110 formulates a universal resource identifier (URI) in which the client 110 includes a set of resource preference properties 126. In the example, two resource preference properties 128 are identified. In addition to the resource preference properties 128, the resource request 162 may also include other identifying information such as the version of XML in which the resource request 162 is being formatted, a namespace identifier of the namespace 142 and an indication that the sought-after resource is a printer.

The resource preference properties 126 and other information provided in the resource request 162 URI are formatted according to extensible markup language specifications in which each of the resource preference properties 126 and other information are delimited by tags (See FIG. 6, 610). Each resource preference property 128 makes up a separate element of the URI. Upon receipt of the resource request 162 from the client 110, the data communications device 120 parses the resource request 162 into individual elements 600 of resource preference properties 128. Next the data communications device 120 compares each resource preference property 128 to individual resource definitions 129 which the data communications device 120 holds in a database of resource definitions to identify a resource 150, 152 capable of providing a resource response 172 in response to the original client request 110 resource request 162. The data communications device 120 may also use other tables, information and/or algorithms in making a determination which resource may be designated to provide a resource response 172. For example, if more than one resource 150, 152 is capable of providing a resource response 172, in response to a resource request 162, the data communications device 120 may alternate between servers 150-1 and 150-2 in order to balance workload.

In this example, the data communications device 120 identifies resource preference properties 128 for a printer of postscript "yes" and location "north" for the client 110 resource request 150, 152. These resource preference properties 128 are compared to resource definitions 129 found in the database of resource definitions 127 for various resources 150, 152. Of the resource definitions 129 found in the database of resource definitions 127, in the example, a resource definition 129-1 showing a printer with postscript "no" and location "yes", might be a possible candidate for a match (See FIG. 7, 129) to the set of resource preference properties 126 of the client 110 resource request 162.

Several different options for matching resource preference properties 126 to resource definitions 129 may alternatively be employed by the data communications device 120. Accordingly, attempting to identify a "closest match" between resource preference properties 126 and resource definitions 129, the data communications device 120, in the example, may recognize a printer having a resource definition 129 of "north" as being the closest match to resource preference properties 128 for a printer of a "north" location even though the resource preference property 128 for a postscript printer is specified in the resource preference properties 126 of the resource request 162, when there is no resource definition 129 for a postscript printer found in the database of resource definitions 127. In this case, the data communications device 120 performs such an "closest match" comparison by adding to a point value 132 for each resource preference property 128 that matches a resource definition 129 for any resource 150, 152 defined in the database of resource definitions 127. In this case a point value of 1 is identified for matching the "north" location resource preference properties 128 to the resource definition 129 of a particular resource 150, 152, for example, in this case, server 150-1 and would thus be the designated resource if no other matches have a point value greater than 1.

In the example of a superset match, if, after each of the resource preference properties 128 of the resource request 162 is compared to the resource definitions 129 in the database of resource definitions 127, each preference property of the resource preference properties 128 of the resource request 162 matches a resource definition 129 of any particular resource, a superset match would exist. Such a superset match exists, even if a resource definition for a particular resource 150, 152 exists, for which there is no parallel resource preference property 128 found in the set of resource preference properties 126 of the resource request 162. In this example, a superset match does not exist because the postscript resource preference property 128 does not match the resource definition 129 of the example printer resource 150, 152. If, however, the example printer resource definition 129 matched the postscript "yes" resource preference property 128, a superset match would exist, even though the printer resource definition 129 included an additional color "BW" resource definition which is not found in the resource preference properties 126 of the resource request 162.

Finally, an exact match might also be tested by the data communications device 120, in which, every resource preference property 128 of the set of resource preference properties 126 of the resource request 162 must match every resource definition 129 of a particular resource 150, 152 and every resource definition 120 of a particular resource 150, 152 must match every resource preference property 128 of the set of resource preference properties 126 of the resource request 162 in order for the data communications device 120 to identify an actual match of the set of resource preference properties 126 to the resource definitions of a particular resource 150, 152. Based on the example discussed, no match could be found in this case. Other methods for matching resource preference properties 128 to resource definitions may also be employed.

Once a resource definition 129 has been matched to the set of resource preference properties 162 in order to identify a resource 150, 152 from which can be obtained a resource response 170, the data communications device 120 may use information provided by the resource definition 129 to in order to obtain the resource response 172. For example, the data communications device 120 may use the IP address of a resource 196.28.62.11, as shown in the example (See FIG. 7, 129) to obtain a resource response. Different approaches for obtaining the selected resource response 172 will be discussed in more detail later.

In order to provide a common vocabulary for resource preference properties 128 and resource definitions 128, a set of resource preference properties 126 and the resource definitions 128 can specify a namespace 142 which can be used to define the set of tag names for the set of resource preference properties 126 and resource definitions 129. Accordingly, the element tags of the set of resource preference properties 126 and resource definitions 129 are validated by the data communications device 120 according to the specified namespace prior to the comparison of set of resource preference properties 126 and resource definitions 129. Additionally, a variation of a namespace, called a Resource Description Framework (RDF) can be employed in conjunction with a namespace 142. In one example, a resource description framework may point to another resource description framework in a more specific namespace 142. This allows support for a hierarchy of namespaces from generic to concrete through multiple indirection.

In step 330, the data communications device 120 provides a resource response 172 from the selected resource 150, 152. The data communications device 120 provides, as a resource response 172, content 172 from the remote server 150. The data communications device 120 locates the instruction 135 for the resource 150, 152 most closely identified with the set of resource preference properties 126 then executes the located instruction 135 for the resource 150, 152 most closely identified with the set of resource preference properties 126. The data communications device 120 can generate a network control command 131 identified with the set of resource preference properties 126 in order to control communications of the resource response 172, package any object components 130, forward the network control command 131 and the object components 130 (e.g. combined into 170) to a remote server 150 to provide a resource response 172.

After a resource 150, 152 has been identified to satisfy the resource request 162 by the data communications device 120 as a result of matching a set of resource preference properties 126 to the database of resource definitions 127, several options for fulfillment of the resource request 162 are possible, within the various embodiments of the invention. In one embodiment of the invention, an actual object or service request 170, 172 can be forwarded by the data communications device 120 to the identified resource 150, 152 (e.g. the resource may be a server, itself, or a particular object, content, service, etc. accessible on a server) for processing. Such processing may include, for example, returning requested content, enacting or returning an object, providing a service, etc. to the requesting client 110. In various embodiments of the invention, a data communications device 120 can also provide other services, etc. such as receiving a resource response 172 (i.e. after having forwarded an object or service request 170, 174 to a resource 150, 152 that was identified by the data communications device 120 using the matching process) and forwarding the resource response 172 to the requesting client 110 or to other intermediate devices.

Another feature of the embodiments of the invention is the ability for the data communications device 120 to use a remote procedure call (See FIG. 7, 135) such as a Java™ remote method identifier, embedded in resource definition 129 metadata (i.e. within the elements of the document) that can be executed by the data communications device 120, in order to actually process the resource request 162 from a remote server 150 or resource 152.

In addition, by providing object level functions that are accessible to the data communications device 120, either within the data communications device 120 itself or from a remote device, that can be applied in response to a client request 110, embodiments of the invention make possible the ability to gain access to a wide range of objects (e.g. which may be housed over diverse locations) including such object management-related functions as object routing, service discovery, XML-CORBA inter-networking, etc.

Also, in various embodiments of the invention, the data communications device 120 can be configured with the capability to provide a resource binding service for binding resource requests 162 to objects and services of a resource 150, 152. By providing that capability to a data communications device 120, a client 110 is enabled to then access such bound objects by proper specification of a set of XML resource preference properties 126. Such requests can then even be used to provide functions such as control over desired network routes, for example, the ability to control selection of inexpensive vs. higher performance routes. Functions such as client control over the data communications device itself are also possible.

Finally, the data communications device 120 can be configured such that the data communications device 120, in response to a particular object request 162, may access a user profile, which is then used in the process of matching the object request 162 to a resource 150, 152. For example, a request for a particular object that accesses a high volume financial data base may cause the data communications device 120 to access such a user profile in order to determine if the particular client computer system 110 initiating the object request 162 is authorized to have access to a resource 150, 152 capable of transmitting the object data over a high speed transmission link in response to the object request 162.

Figure 3B:
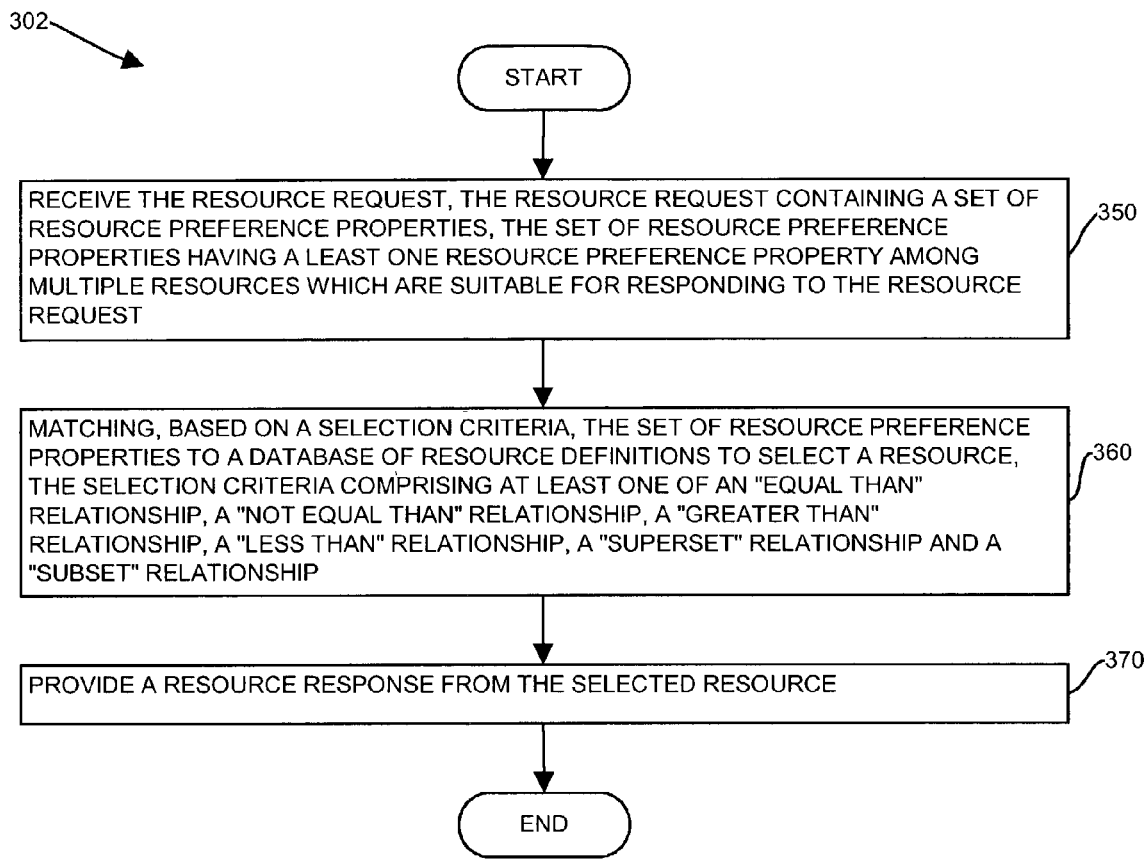
FIG. 3B is an alternative flow chart of a procedure 302 for processing a request performed by a data communications device according to one embodiment of the invention.

FIG. 3B is an alternative flow chart of a procedure 302 for processing a request performed by a data communications device according to one embodiment of the invention.

In step 350, the data communications device 120 receives the resource request 162, the resource request 162 containing a set of resource preference properties 126, the set of resource preference properties 126 having at least one resource preference property. As described earlier, resource preference properties 126 identify one or more qualities, preference properties, parameters or features, etc. of a desired resource 152 rather than the specific name of the resource.

In step 360, the data communications device 120 matches, based on a selection criteria, the set of resource preference properties 126 to a database of resource definitions 127 to select a resource 150, the selection criteria comprising at least one of an "equal than" relationship, a "not equal than" relationship, a "greater than" relationship, a "less than" relationship, a "superset" relationship and a "subset" relationship, etc. The selection criteria, may be mathematical or other relationships that can be used to determine if the resource preference properties 126 and database of resource definitions 127 for a particular resource should be selected based on such a match.

In step 370, the data communications device 120 provides a resource response 172 from the selected resource 150, 152 in the same manner as described earlier with respect to FIG. 3A.

Figure 4:
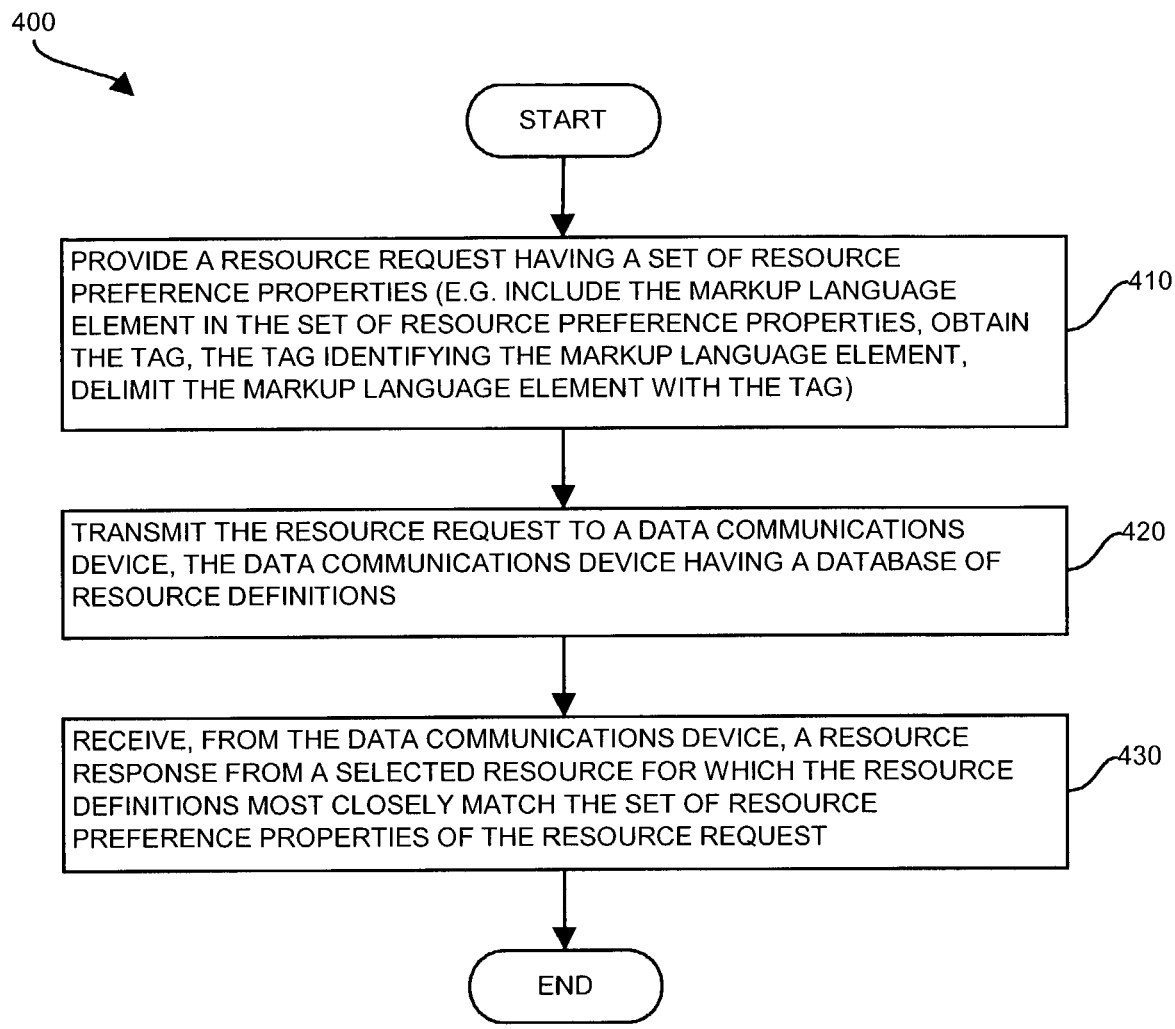
FIG. 4 is a flow chart of a procedure 400 for obtaining a resource response performed by a client according to one embodiment of the invention.

FIG. 4 is a flow chart of a procedure 400 for obtaining a resource response performed by the client according to one embodiment of the invention.

In step 410, the client provides a resource request 162 having a set of resource preference properties 126. The resource preference properties 126 can include the markup language element 128 in the set of resource preference properties 126. The client 110 obtains the tag 610, the tag 610 identifying the markup language element 128, and delimits the markup language element 128 with the tag 610.

In step 420, the client 110 transmits the resource request 162 to a data communications device 120, the data communications device 120 having a database of resource definitions 127.

In step 430, the client 110 receives, from the data communications device 120, a resource response 172 from a selected resource 150, 152 for which the resource definitions 129 most closely match the set of resource preference properties 126 of the resource request 162. As described herein, the selected resource 152, as it is referred to, can be an accessible object or service located on a particular server 150 or, in other cases, the selected resource can be the actual server 150 itself, which may also be referred to as a resource.

The client 110 receives a resource response 172 from the resource 150, 152, selected as a result of the matching process conducted by the data communications device 120. Such a resource response 172 may take a variety of forms including content returned to the client 110, an object response to the client 110, performance of a service for the benefit of the client 110 in response to the client request 110, etc. The response could either have been provided as a result of an object, service, etc. request forwarded to the resource 150, 152 and returned directly to the client 110, or alternatively as a result of a redirection request returned by the data communications device 120 to the client, or by the data communications device 120 receiving the resource response 172 back from the selected resource 150 and forwarding the resource response 172 back to the client 110 or other alternatives.

FIG. 5 shows an example of a resource request which contains resource preference properties according to one embodiment of the invention.

The resource request includes a set of resource preference properties 126 and may include other information such as a namespace designation, an indication of the XML version in use, etc. All of the resource preference properties 128 and other information are contained within the URI and may be formatted according to an XML format.

FIG. 6 shows an extensible markup language element according to one embodiment of the invention.

As shown, by way of example, the extensible markup language element comprises tags which have names (e.g. postscript, location, etc.). The tags are used to delimit individual elements which make up the set of resource preference properties 162.

FIG. 7 is a depiction of the resource definitions for a resource according to one embodiment of the invention.

As described, with respect to the resource preference properties 128, the resource definitions 129 are formatted according to an XML format including the use of tags with names that delimit individual element of the resource definitions 129 of different resources 150, 152. The resource definitions 129 may also include other information such as a namespace 142 designation, an indication of the XML version in use, etc. Resource definitions 129 are stored within a database of resource definitions 127 on the data communications device 120.

Figure 8:
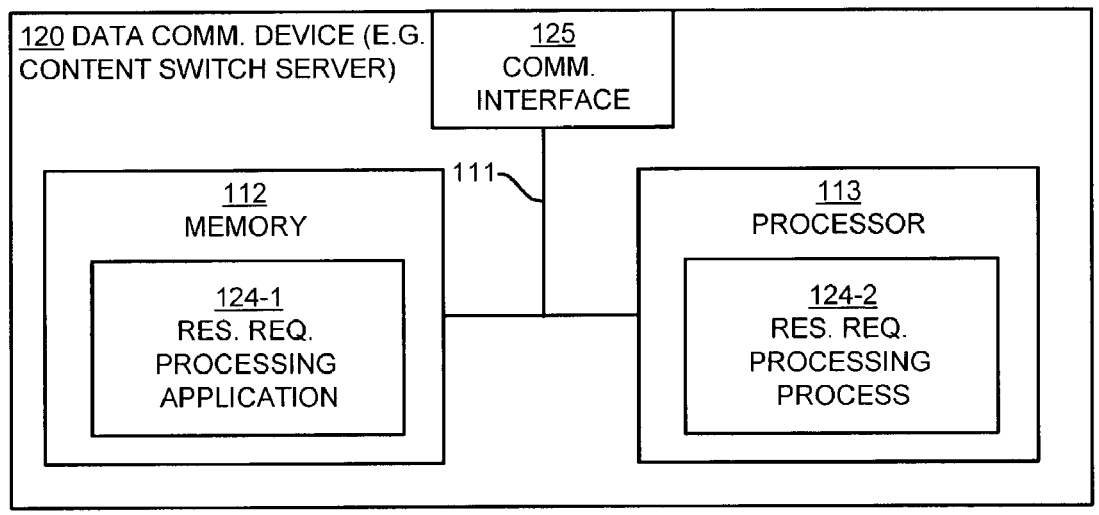
FIG. 8 shows a general purpose computer 800 implementation of a data communications device according to one embodiment of the invention.

FIG. 8 shows a general purpose computer 800 implementation of a data communications device 120 according to one embodiment of the invention. The example data communications device 120 includes an interconnection mechanism 111 (e.g., a data bus and/or circuitry) which couples a memory 112 (e.g., any computer readable medium such as random access memory (RAM) and/or read only memory (ROM) or even a disk or storage medium) having a resource request processing application, a processor 113 (e.g., a microprocessor or central processing unit) having a resource request process and a communications interface 125 (e.g., modem or other network interface). The data communications device 120 may also have an input/output interface which allows peripheral devices to be connected to the data communications device 120 and operate as part of the data communications device 120. The communications interface 115 allows the data communications device 120 to communicate with the client computer system 110 via the network 105.

Figure 9:
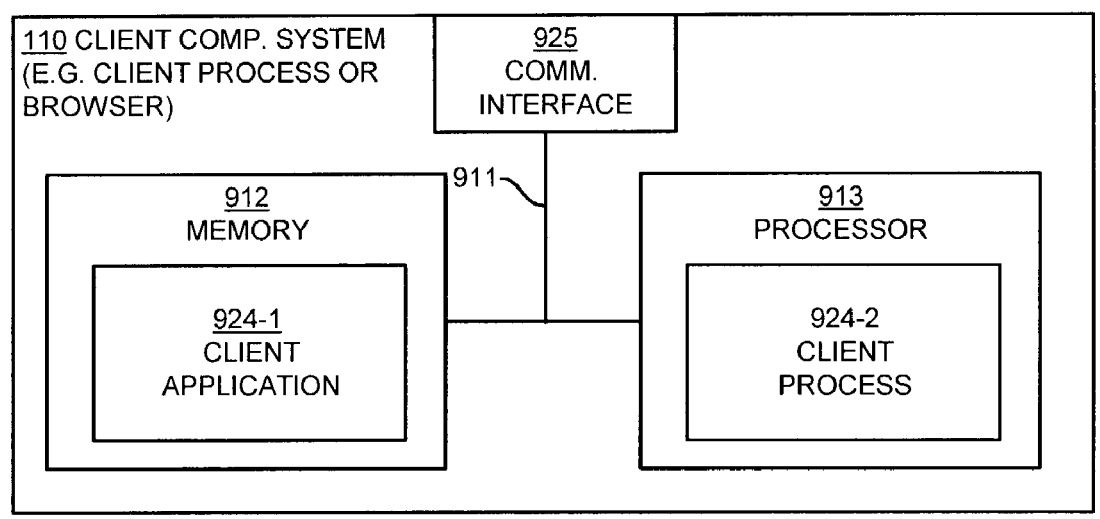
FIG. 9 shows a general purpose computer 900 implementation of a client according to one embodiment of the invention.

FIG. 9 shows a general purpose computer 900 implementation of a client according to one embodiment of the invention according to one embodiment of the invention.

The example client computer system 110 includes an interconnection mechanism 911 (e.g., a data bus and/or circuitry) which couples a memory 912 (e.g., any computer readable medium such as random access memory (RAM) and/or read only memory (ROM) or even a disk or storage medium) having a resource request generation application, a processor 913 (e.g., a microprocessor or central processing unit) having a resource request generation process and a communications interface 925 (e.g., modem or other network interface). The client computer system 110 may also have an input/output interface which allows peripheral devices to be connected to the client computer system and operate as part of the client computer system 110. The communications interface 925 allows the client computer system 110 to communicate with the data communications device 120 via the network 105.

The features of the invention may be employed in data communications device and other computerized devices such as those manufactured by Cisco systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, data communications devices can be routers, bridges, switches, access servers, gateways, hubs, concentrators, proxy servers, repeaters and so forth which exchange data over an interconnection of data links. These may be physical connections or may also be provided using wireless communication mechanisms. On the low end they may also be as simple as wire connections between two devices. The network allows data to propagate between various applications that execute on the hosts.

Various physical or hardware data communications connection mechanisms allow devices to interconnect with the network 105. Physical data communications connection mechanisms can include modems, transceivers, network interface cards, fiber optic cards, ports and other hardware devices and many others which allow data to be transferred at various data transfer rates (i.e., bandwidth) to and from the host and between data communications devices. For example, certain devices or hosts may have high speed network interfaces which provide connections to the network at high data rate such as fractional-T1, T1, E1 or higher, while other devices or hosts may use an inexpensive modem that provides a maximum data transfer rate of 56.6 kilobits per second (Kbps), more or less, to and from the network.

Embodiments of the invention also include computer program products such as disks, or other readable media that have a computer-readable medium including computer program logic encoded thereon for controlling transmission of stream data between the client and stream servers in a networked computer environment, such that the computer program logic, when executed on at least one processing unit with the computerized device, causes the at least one processing unit to perform any or all of the aforementioned methods. The methods embodiments of the invention may be implemented by computer software and/or hardware mechanisms within a data communications device apparatus.

The invention, as described herein, is directed to techniques for providing a network-level object request brokering service that can be used as a mechanism for object or service discovery and which enables a client to make an object request without knowing it's actual network location before hand.

By using the Universal Resource Identifier (URI) address format and using an Extensible Markup Language (XML) metadata format to designate preference properties of a sought-after object or service (e.g. a resource response), embodiments of the invention are able to identify the sought-after resource response and its location. Upon receipt of the request, a data communications device, such as a content services switch, parses the request to obtain a set of resource preference properties. In turn, the data communications device matches individual resource preference properties to resource definitions which also include the location of the sought-after resource maintained on the data communications device in a database. The data communications device then takes appropriate steps to complete the original client resource request.

What is claimed is:

1. A method for processing a resource request, the method comprising the steps of:
   receiving the resource request, the resource request containing a set of resource preference properties, the set of resource preference properties having at least one resource preference property;
   comparing the set of resource preference properties to a database of resource definitions to select a resource, the resource being most closely identified with the set of resource preference properties among multiple resources which are suitable for responding to the resource request; and
   providing a resource response from the selected resource;
   wherein a namespace is accessible to the data communications device, wherein the namespace controls usage of the resource preference properties and of the resource definitions, and wherein the step of comparing includes:
   checking the namespace prior to comparing resource preference properties to resource definitions: and
   processing the resource preference properties contained in the resource request and processing the resource definitions.

2. The method of claim 1 wherein the set of resource preference properties includes a resource preference property formatted as a markup language element, the markup language element having a tag which delimits the markup language element, and wherein the step of comparing includes the step of:
   extracting the markup language element from the set of resource preference properties based on the tag.

3. The method of claim 2 wherein the step of extracting includes the steps of:
   isolating the markup language element within the set of resource preference properties based on the tag; and
   obtaining data of the markup language element for comparison with the database of resource definitions.

4. The method of claim 1 wherein the resource which is most closely identified with the set of resource preference properties is a remote server and wherein the step of providing the resource response includes the step of:
   providing, as the resource response, content from the remote server.

5. The method of claim 1 wherein the resource definitions contain an instruction for accessing a resource located on a remote server, wherein the instruction operates the resource and wherein the step of providing the resource response includes the steps of:
   locating the instruction for the resource most closely identified with the set of resource preference properties; and
   executing the located instruction for the resource most closely identified with the set of resource preference properties in order to provide the resource response from the selected resource.

6. The method of claim 1 wherein the resource preference properties of the set of resource preference properties are associated with the resource definitions of the resources, wherein the database of resource definitions contains the resource definitions of the resources and wherein the step of comparing includes the step of:
   matching each of the resource preference properties of the set of resource preference properties to the resource definitions of the resources;
   adding to a point value for each resource definition that matches one of the resource preference properties; and
   picking, as the selected resource, the resource having the highest point value.

7. The method of claim 1 wherein the resource preference properties of the set of resource preference properties are associated with the resource definitions of the resources, wherein the database of resource definitions contains the resource definitions of the resources and wherein the step of comparing includes the step of:
   matching each of the resource preference properties of the set of resource preference properties to the resource definitions of the resources; and
   picking, as the selected resource, the resource for which all the resource preference properties of the resource request match the resource definitions of the resource.

8. The method of claim 1 wherein the resource preference properties of the set of resource preference properties are associated with the resource definitions of the resource, wherein the database of resource definitions contains the resource definitions of resources and wherein the step of comparing includes the step of:
   matching each of the resource preference properties of the set of resource preference properties to the resource definitions of the resource; and
   picking, as the selected resource, the resource for which all the resource preference properties of the resource request match the resource definitions of the selected resource such that all of the resource definitions of the selected resource also all match resource preference properties of the resource request.

9. The method of claim 1 wherein the data communications device controls network communications functions, wherein any object components related to provision of the resource response are available to the data communications device and wherein the step of providing the resource response includes the step of:
   generating a network control command identified with the set of resource preference properties in order to control communications of the resource response;

packaging any object components; and forwarding the network control command and the object components to a remote server to provide a resource response.

10. The method of claim 1, wherein the at least one resource preference property identifies a parameter associated with a resource, the parameter being distinct from a specific identity of a resource.

11. The method of claim 1, wherein the resource which is most closely identified with the at least one resource preference properties is a remote server and wherein the step of providing the resource response includes the step of:

providing, as the resource response, content from the remote server.

12. A data communications device, for processing a resource request, comprising:

a communications interface;

a controller coupled to the communications interface, wherein the communications interface is configured to receive the resource request, the resource request containing a set of resource preference properties, the set of resource preference properties having at least one resource preference property;

the controller is configured to compare the set of resource preference properties to a database of resource definitions to select a resource, the resource being most closely identified with the set of resource preference properties; and the communications interface is configured to provide a resource response from the selected resource;

wherein a namespace is accessible to the data communications device, wherein the namespace controls usage of the resource preference properties and of the resource definitions, and wherein, to compare the set of resource preference properties, the controller is configured to:

check the collection of namespace definitions prior to comparing resource preference properties to resource definitions; and process the resource preference properties contained in the resource request and processing the resource definitions.

13. The data communications device of claim 12 wherein the set of resource preference properties includes a resource preference property formatted as a markup language element, the markup language element having a tag which delimits the markup language element, and wherein to compare the set of resource preference properties, the controller is configured to:

extract the markup language element from the set of resource preference properties based on the tag.

14. The data communications device of claim 13 wherein, to extract the markup language element, the controller is configured to:

isolate the markup language element within the set of resource preference properties based on the tag; and obtain data of the markup language element for comparison with the database of resource definitions.

15. The data communications device of claim 12 wherein the resource which is most closely identified with the set of resource preference properties is a remote server and wherein, to perform the step of providing the resource response, the communications interface is configured to:

provide, as the resource response, content from the remote server.

16. The data communications device of claim 12 wherein the resource definitions contain an instruction for accessing a resource located on a remote server, wherein the instruction operates the resource and wherein, to provide the resource response, the controller is configured to:

locate the instruction for the resource most closely identified with the set of resource preference properties; and execute the located instruction for the resource most closely identified with the set of resource preference properties in order to provide the resource response from the selected resource.

17. The data communications device of claim 12 wherein the resource preference properties of the set of resource preference properties are associated with the resource definitions of the resources, wherein the database of resource definitions contains the resource definitions of the resources and wherein, to compare the set of resource preference properties, the controller is configured to:

match each of the resource preference properties of the set of resource preference properties to the resource definitions of the resources;

add to a point value for each resource definition that matches one of the resource preference properties; and pick, as the selected resource, the resource having the highest point value.

18. The data communications device of claim 12 wherein the resource preference properties of the set of resource preference properties are associated with the resource definitions of the resources, wherein the database of resource definitions contains the resource definitions of the resources and wherein, to compare the set of resource preference properties, the controller is configured to:

match each of the resource preference properties of the set of resource preference properties to the resource definitions of the resources; and pick, as the selected resource, the resource for which all the resource preference properties of the resource request match the resource definitions of the resource.

19. The data communications device of 12 wherein the resource preference properties of the set of resource preference properties are associated with the resource definitions of the resource, wherein the database of resource definitions contains the resource definitions of resources and wherein, to compare the set of resource preference properties, the controller is configured to:

match each of the resource preference properties of the set of resource preference properties to the resource definitions of the resource; and pick, as the selected resource, the resource for which all the resource preference properties of the resource request match the resource definitions of the selected resource such that all of the resource definitions of the selected resource also all match resource preference properties of the resource request.

20. The data communications device of claim 12 wherein the data communications device controls network communications functions, wherein any object components related to provision of the resource response are available to the data communications device and wherein, to provide the resource response, the communications interface is configured to:

generate a network control command identified with the set of resource preference properties in order to control communications of the resource response;

package any object components; and forward the network control command and the object components to a remote server to provide a resource response.

21. The data communications device of claim 12, wherein the at least one resource preference property identifies a parameter associated with a resource, the parameter being distinct from a specific identity of a resource.

22. The data communications device of claim 21 wherein the resource which is most closely identified with the at least one resource preference properties is a remote server and wherein, when providing, the communications interface is configured to provide, as the resource response, content from the remote server.

23. A computer program product that includes a computer readable medium having instructions stored thereon for processing a resource request such that when the instructions are carried out by a computer, the computer is capable of performing the steps of:
receiving the resource request, the resource request containing a set of resource preference properties, the set of resource preference properties having at least one resource preference property;
comparing the set of resource preference properties to a database of resource definitions to select a resource, the resource being most closely identified with the set of resource preference properties; and
providing a resource response from the selected resource;
wherein a namespace is accessible to the computer, wherein the namespace controls usage of the resource preference properties and of the resource definitions, and wherein the step of comparing includes:
checking the namespace Prior to comparing resource preference properties to resource definitions; and
processing the resource preference properties contained in the resource request and processing the resource definitions.

24. A data communications device, for processing a resource request, comprising:
a communications interface;
a controller;
an interconnection mechanism coupling the communications interface to the controller;
means, coupled to the communications interface, for receiving the resource request, the resource request containing a set of resource preference properties, the set of resource preference properties having at least one resource preference property;
means, coupled to the controller, for comparing the set of resource preference properties to a database of resource definitions to select a resource, the resource being most closely identified with the set of resource preference properties; and
means, coupled to the communications interface, for providing a resource response from the selected resource;
wherein a namespace is accessible to the data communications device, wherein the namespace controls usage of the resource preference properties and of the resource definitions, and wherein the means for comparing includes:
means for checking the namespace prior to comparing resource preference properties to resource definitions; and
means for processing the resource preference properties contained in the resource request and processing the resource definitions.

* * * * *